Oct. 17, 1961 — H. KLEIN — 3,004,286
PROCESS AND APPARATUS FOR MANUFACTURING REINFORCED PLASTIC TUBES
Filed Oct. 15, 1958 — 4 Sheets-Sheet 1

INVENTOR
Heinrich Klein
BY Michael S. Striker
Attorney

Oct. 17, 1961
H. KLEIN
3,004,286
PROCESS AND APPARATUS FOR MANUFACTURING
REINFORCED PLASTIC TUBES
Filed Oct. 15, 1958
4 Sheets-Sheet 3
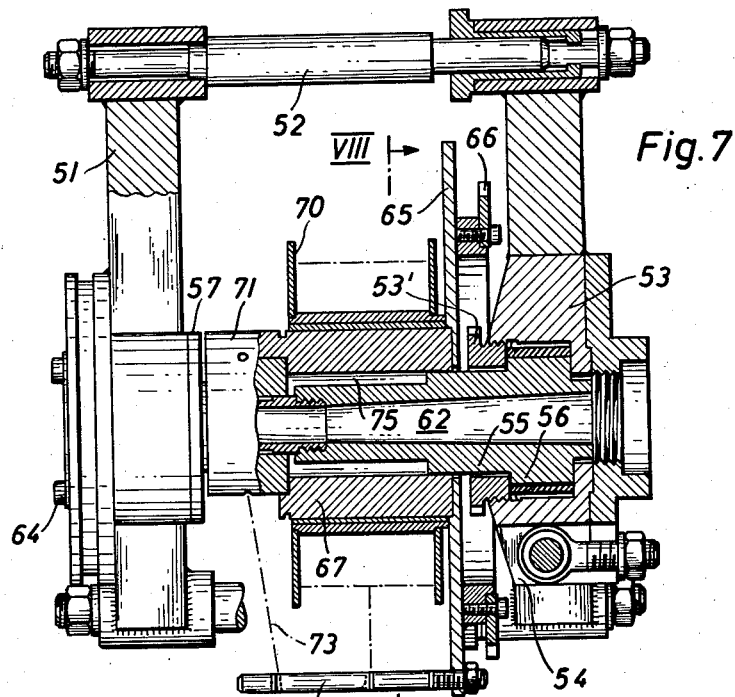
Fig. 7
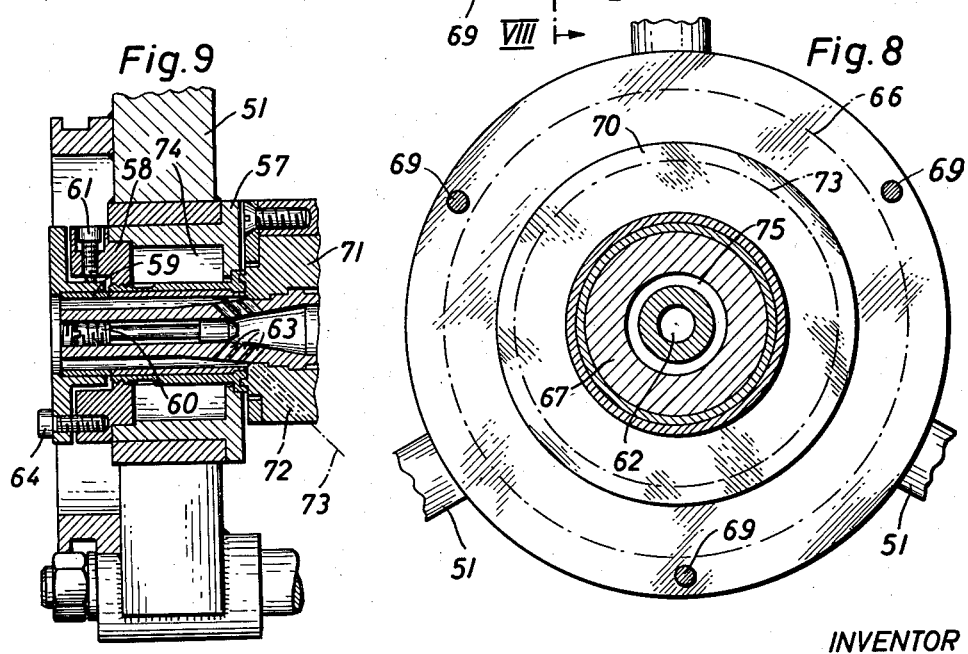
Fig. 9
Fig. 8
INVENTOR
Heinrich Klein
BY
Michael S. Striker
Attorney INVENTOR
Heinrich Klein
BY Michael S. Striker
Attorney United States Patent Office 3,004,286
Patented Oct. 17, 1961

3,004,286
PROCESS AND APPARATUS FOR MANUFACTURING REINFORCED PLASTIC TUBES
Heinrich Klein, Bonn, Germany, assignor to Firma Eschweiler Bergwerks-Verein, Kreis Aachen, Germany, a firm
Filed Oct. 15, 1958, Ser. No. 768,524
Claims priority, application Germany Oct. 16, 1957
18 Claims. (Cl. 18—13)

The present invention relates to reinforced plastic tubes, and more particularly to processes and apparatus for manufacturing such tubes.

One of the objects of the present invention is to provide a process and apparatus which guarantee that the reinforcing material of the tube is embedded in the wall thereof without being exposed at the inner or outer surfaces of the tube so that the latter surfaces will be perfectly smooth.

It is also an object of the present invention to provide a process and apparatus according to which long lengths of reinforced tube can be continuously manufactured without difficulty.

A further object of the present invention is to provide an apparatus which will reliably prevent reinforcing filaments from breaking so that interruptions in the operation for repairing broken filaments are avoided.

An additional object of the present invention is to provide a process and apparatus capable of embedding in the wall of a plastic tube during extrusion of the latter one or more helically wound reinforcing filaments.

With the above objects in view the present invention includes in a process for manufacturing the reinforced plastic tubes, the steps of extruding a plastic material first into the form of a plastic bar and immediately thereafter, while the plastic material is still soft, into the form of a plastic tube, and introducing the reinforcing material into the bar of plastic material before the latter is formed into the tube so that the reinforcing material is reliably embedded in the wall of the tube.

Also with the above objects in view, the present invention includes in an apparatus for manufacturing reinforced plastic tubes, an extruder outlet and an elongated hollow tube connected to and extending from this outlet so that the plastic material will flow from the extruder outlet along the interior of the tube. A bar is fixed to and extends from an end of the tube distant from the extruder outlet, and the tube is formed at a wall portion thereof which is adjacent to the bar with a plurality of cutouts passing through the wall of the tube, so that the plastic material will flow from the interior of the tube through the cutouts in the wall portion thereof adjacent to the bar to the exterior of the tube. The bar as well as the wall portion of the tube adjacent thereto are surrounded by an elongated sleeve which is spaced from the bar and tube to define therewith an elongated annular passage which has an open front end so that the plastic material will advance forwardly along this annular passage to take the shape of a tube. At the rear end of this sleeve a combined closure and feeding means cooperates with the tube and sleeve to close at least partially the annular passage adjacent to the rear end of the wall portion of the tube which is formed with the cutouts and to feed into the annular passage a reinforcing material which becomes embedded in the plastic, so that this reinforcing material is introduced into the plastic material at the place where it issues from the interior of the tube extending from the extruder outlet and in this way the plastic material is reliably provided with the reinforcing material embedded therein just before the plastic material is formed into a plastic tube.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 7 is a fragmentary partly sectional axial elevation of a third embodiment of a structure according to the present invention;

FIG. 8 is a fragmentary partly sectional transverse elevation of the structure of FIG. 7 taken along line VIII—VIII of FIG. 7 in the direction of the arrows;

FIG. 9 is a fragmentary axial sectional elevation of the structure shown at the left end of FIG. 7;

Figure 1:
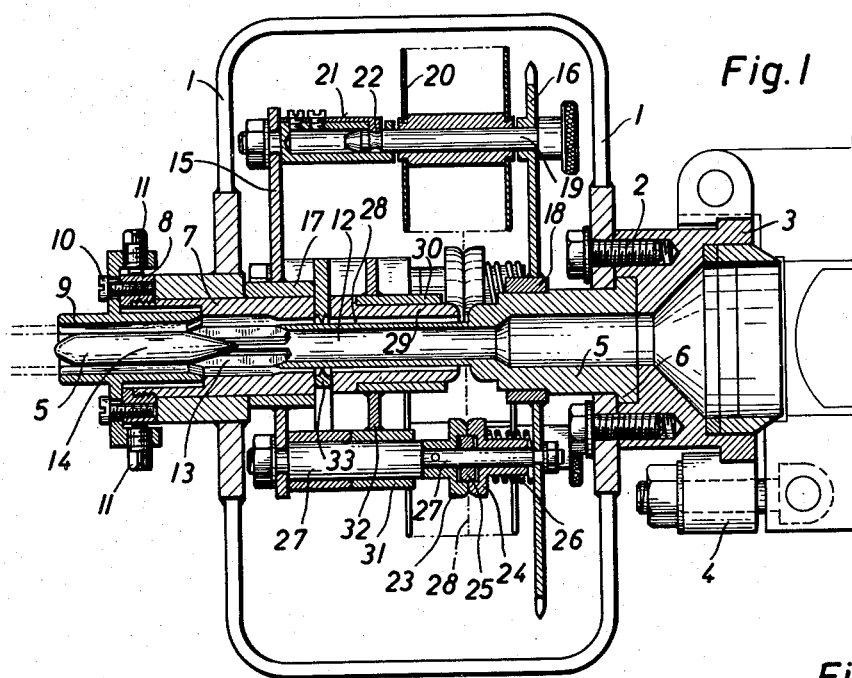
FIG. 1 is an axial, sectional elevation showing one embodiment of an apparatus according to the present invention connected to an extruder outlet.
Figure 3:
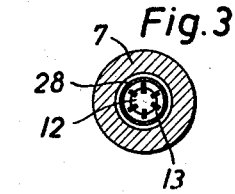
FIG. 3 is a transverse section of the inner extruding tube and outer sleeve surrounding the same at the wall portion of this tube which is formed with cutouts through which the plastic material flows.
Figure 2:
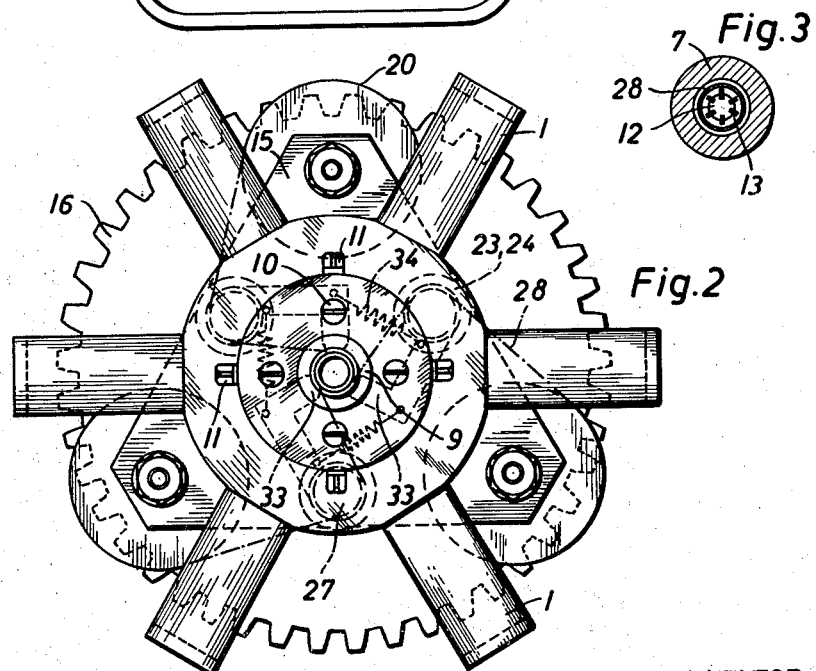
FIG. 2 is a schematic end view of the structure of FIG. 1 as seen from the left of FIG. 1 with certain elements omitted for the sake of clarity.

Referring now to the drawings, FIGS. 1 and 2 show a stationary frame 1 fixed by the screws 2 to the annular member 3 which forms part of an extruder outlet. Only the outlet portion of the extruder is shown at the right of FIG. 1, and a ring 4 is pivotally carried by the extruder and surrounds and engages a shoulder of the member 3, this ring 4 being urged toward the extruder outlet by the pivotable bolt shown at the lower right of FIG. 1 and extending into a downwardly directed notch of the ring 4 so that the latter tightly presses the member 3 against the remainder of the extruder outlet, and the screws 2 serve to fix the assembly of the invention to the extruder outlet. These screws 2 pass through openings of a flat ring located at the right of the frame 1, as viewed in Fig. 1, a similar coaxial ring being located at the left of the frame 1, and the frame 1 including in addition to these rings a plurality of substantially U-shaped, substantially rigid metal straps distributed circumferentially around the common axis of the latter rings and each strap being welded at its free ends respectively to the exterior peripheries of these rings.

The right ring of the frame 1, as viewed in FIG. 1, which is fixed by the screws 2 to the extruder outlet member 3 presses with its inner peripheral portion against an annular flange 6 of an elongated hollow extruding tube 5 which is fixed in this way to and extends from the extruder outlet so that the plastic material flows from the extruder outlet along the interior of the hollow metal tube 5 in the form of a non-hollow bar of soft plastic material. A solid metal bar 14 is fixed to and extends forwardly from the front end of the tube 5. The bar 14 and tube 5 are cylindrical. Adjacent to the bar 14 the tube 5 has a wall portion formed with a plurality of cutouts extending through the wall of the tube 5 and defining between themselves the axially extending flat plates 13 which are fixed at their rear ends to and extend forwardly from the tube 5 and which are fixed at their front ends to the rear conical end portion of the bar 14 forwardly of the apex of this conical portion at the rear extremity of the bar 14. Thus, the bar of soft plastic material flowing axially along the interior of the tube 5 from the extruder outlet will flow radially through the spaces between the plates 13 to the exterior of the tube 5 at the wall portion thereof formed with the cutouts which provide the spaces between the plates 13.

An elongated sleeve 9, 7 is spaced from and surrounds the bar 14 and forward portion of the tube 5 to define with the bar 14 and the forward portion of the tube 5 an elongated annular passage which is open at its front end shown at the left of FIG. 1, so that the plastic material after flowing through the spaces between the plates 13 will take the shape of a plastic tube advancing continuously along this axial passage to issue from the front open end thereof as shown in dot-dash lines at the left of FIG. 1. The rear tubular part 7 of the sleeve 9, 7 threadedly carries at its front end a ring 8, and a plurality of screws 10 pass through openings in a flange integral with and extending from the front tubular part 9 of the sleeve 9, 7 and are threadedly connected with the ring 8 for fixing the parts 9 and 7 to each other, and the flange which carries the screws 10 is formed at its outer periphery with a rearwardly extending cylindrical portion formed with radial threaded bores distributed about this cylindrical portion and threadedly carrying set screws 11 which press with their inner ends against the exterior of the ring 8 so that the set screws 11 may be turned to adjust the tubular member 9 so that it will be accurately positioned coaxially with respect to the bar 14. It will be noted that the diameter of the interior of the tubular part 7 is increased slightly at the portion thereof surrounding the plates 13 and that the interior of part 9 is flared slightly at its portion located next to the part 7. The left ring of the frame 1, as viewed in FIG. 1, surrounds and is welded to a tube which surrounds and carries the tubular member 7 and which has its left end in engagement with the right end face of the ring 8, as viewed in FIG. 1. There is a slight play in the threaded connection between the screws 10 and ring 8 to provide for the radial adjustment of the tubular member 9 by the screws 11. Thus, the plastic material is in the form of a soft bar in the hollow interior 12 of the tube 5 and is then extruded into a plastic tube in the space surrounding the bar 14.

The above described structure remains stationary during operation of the apparatus. A winding means which forms part of the assembly is turnable about the tube 5 to helically wind onto an exterior surface portion thereof a reinforcing material in the form of one or more reinforcing filaments. This winding means includes the front and rear discs 15 and 16 which are respectively fixed at their inner peripheries to a pair of sleeves 17 and 18 which are respectively turnable on the tubes 7 and 5. The discs 16 is in the form of a sprocket wheel adapted to be driven by an unillustrated chain from a suitable motor. This disc 16 is formed with three openings spaced 120° from each other and a plurality of pins 19, which respectively support spools 20 for free rotation extend through the openings of the disc 16 into hollow coaxial tubes, respectively, which are fixed to the disc 15 and extend therefrom toward the disc 16. The latter tubes fixedly carry leaf springs 21 which respectively have at their right ends, as viewed in FIG. 1, projections 22 which extend respectively into annular grooves of the pins 19 to releasably hold the latter in the position shown in FIG. 1. Thus, it is possible to replace the spools 20 whenever desired.

In the illustrated example three reinforcing filaments will be drawn from the spools 20 and wound onto the tube 5 with the convolutions of each filament separated by the convolutions of the other two filaments so that the three filaments will be wound in the manner of a triple thread. On the discs 15 and 16 are mounted suitable braking devices to guarantee that the filaments are taut when wound onto the tube 5, and the three braking devices respectively cooperate with the three filaments supplied by the three spools 20. Each of these braking devices includes a shaft 27 extending between and fixed to the discs 15 and 16. Each shaft 27 has at its right, as viewed in FIG. 1, a portion of reduced diameter carrying a pair of braking discs 23 and 24 which have, respectively, annular lips extending toward and engaging each other and defining a space in which a small disc 25 is located so that this disc 25 extends across the interface between the discs 23 and 24 to prevent the filaments from moving inwardly toward the shafts 27 beyond the outer periphery of the disc 25. The discs 23 have tubular hub portions fixed to the shafts 27, respectively, next to the shoulders between the portions thereof of different diameter, and each disc 24 has a tubular portion surrounded by a spring 26 which presses against the disc 16 as well as against the disc 24 to urge the latter toward the disc 23 to provide the braking action. As is evident from FIG. 2, each reinforcing filament 28 passes from its supply spool 20 around one of the braking devices to the tube 5. During the operation of the apparatus the filament convolutions on the tube 5 are closely spaced and continuously advance to the left along the exterior of the tube 5, as viewed in FIG. 1. In order to prevent the convolutions from overlapping each other, a tube 29 surrounds and is spaced from the tube 5 by a distance substantially equal to the thickness of the filament 28. This tube 29 is carried by a surrounding tube 30 which is fixed to radially extending members 32 which are respectively fixed at their outer ends to sleeves 31 through which the shafts 27 respectively extend, so that in this way the tube 29 is supported.

Between the tube 29 and the rear end of the sleeve 9, 7 is located a combined closure and feeding means which at least partially closes the rear end of the annular passage into which the plastic material flows from the tube 5. In the example shown in FIGS. 1 and 2, this combined closure and feeding means includes a plurality of levers 33. In the illustrated example there are three levers 33 distributed about the tube 5 and supported for turning movement about axes, respectively, parallel thereto. Each lever 33 is fixed to a sleeve turnable on one of the shafts 27, and each lever 33 has an arcuate knife-edge end engaging the exterior surface of the tube 5 and these ends of the levers 33 extend between the convolutions of the reinforcing filaments to space these convolutions from each other in a controlled manner at a distance greater than the spacing between the convolutions within the tube 29. Thus, the levers 33 on the one hand partially close the rear end of the annular passage in which the plastic material is formed into a tube and on the other hand control the feeding of the reinforcing filaments into this annular passage. The plurality of springs 34 are fixed to the levers 33 in the manner shown in FIG. 2 for maintaining the knife-edge ends of the levers 33 pressed against the exterior surface of the tube 5 just to the rear of the openings thereof through which the plastic material flows into the enlarged inner portion of the sleeve part 7. Since the levers 33 rotate with the winding means and cannot be angularly displaced with respect thereto, the levers 33 feed into the plastic material exactly as many convolutions as are wound onto the tube 5 by the winding means, so that although the convolutions are spaced closer together within the tube 29 than to the left of the levers 33, the total number of convolutions remains constant.

The winding means is rotated at such a speed with respect to the speed of forward movement of the plastic material that the filament convolutions, in addition to being spread apart by the ends of the levers 33, are further spread apart from each other by the plastic material itself, and thus there is provided between the convolutions as soon as they are introduced into the plastic material sufficient free spaces through which the plastic material can freely flow to completely surround the reinforcing filaments so that they are entirely embedded in the plastic material. It will be noted that the rearmost portion of the sleeve part 7, just ahead of the levers 33, is spaced from the exterior surface of the tube 5 by a distance approximately equal to the thickness of the filaments, so that the forwardly moving filaments themselves guarantee that the plastic material flows forwardly toward the left end of the sleeve 9, 7 as viewed in FIG. 1. It is clear that in the spaces between the plates 13 at the junction between the tubular and bar portions of plastic material this plastic material can completely surround the filaments, moreover, since the outer edges of the plates 13 are located radially beyond the exterior surface of the bar 14, the reinforcing filaments will reliably be located between the inner and outer surfaces of the final plastic tube. Before the extrusion of the plastic material is started, the reinforcing filaments are wound onto the tube 5 and threaded through the annular passage formed between the sleeve 9, 7 and the bar 14 and portion of tube 5 adjoining the same, and thereafter when the plastic material flows through the apparatus it will continue the advancing of the filaments with the winding means also serving to maintain the filaments wound on the tube 5 as they are being drawn off the same by the advancing plastic material.

The reinforcing filaments may be made of metal or plastic and can have any desired cross section. Instead of wire in the form of metal monofilaments, it is also possible to use filaments in the form of stranded wire, and it is also possible to use strips or bands. In the case of reinforcing bands, the latter can be perforated and the convolutions thereof can be permitted to remain in engagement with each other since the plastic material can flow freely through such perforations, and thus the plastic material can reliably completely surround such bands.

Figure 4:
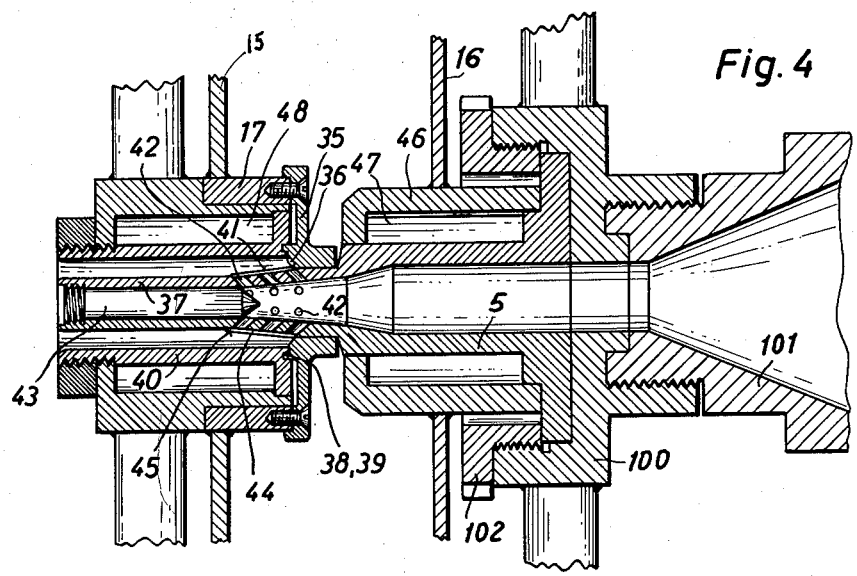
FIG. 4 is a fragmentary axial sectional elevational of another embodiment of an apparatus according to the present invention.
Figure 5:
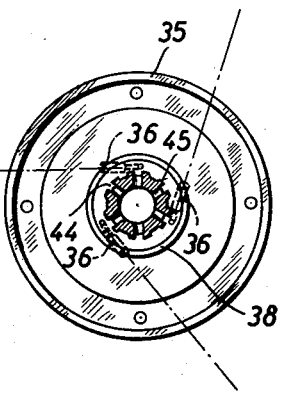
FIG. 5 is a schematic partly sectional transverse view of the structure of FIG. 4 illustrating a disc which forms a combined closure and feeding means.
Figure 6:
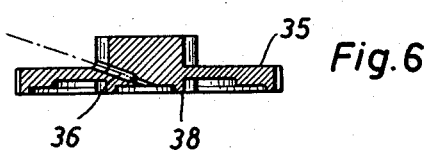
FIG. 6 is a sectional view of the disc of FIG. 5 in a plane located along an axis of a bore of the disc which extends tangentially to the tube surrounded by the disc.

In the embodiment of the invention which is illustrated in FIGS. 4-6, the prewinding of the reinforcing filaments before they are introduced into the plastic material is avoided. The winding takes place simultaneously with the introduction of the filaments into the plastic material. According to this embodiment, the combined closure and feeding means for the rear end of the annular passage along which the plastic material flows takes the form of a disc 35 which is fixed to the tube 17 of the winding means so that the disc 35 turns with the discs 15 and 16 of the embodiment of FIG. 4. These discs 15 and 16 in the embodiment of FIG. 4 support in the same way as in the embodiment of FIG. 1 the structure which carries the three spools 20 and the three braking devices, but there are no pivotally supported levers 33 in the embodiment of FIG. 4, this latter structure being replaced by the disc 35. This disc 35 is formed with three equidistantly spaced bores 36 each of which extends tangentially to the tube 5 from the rear end of the annular passage to which the filaments move outwardly to the rear face of the disc 35 which is directed away from this annular passage. The arrangement of the bores 36 is clearly illustrated in FIGS. 5 and 6, and the three reinforcing filaments respectively pass through these bores 36 which respectively have adjacent to the hub of the disc 35 portions of a reduced diameter substantially equal to the diameter of the filaments. The axially advancing plastic material continuously moves the reinforcing filaments to the left, as viewed in FIG. 4, beyond the disc 35 while the rotary movement of the latter winds the filaments into helical form, this rotary movement being derived from the chain drive of the disc 16, as described above. The disc 35 is in fluid-tight sliding engagement with the exterior portion of the tube 5 on which the disc 35 turns.

In the embodiment of FIG. 4, the sleeve 9, 7 is replaced by a unitary sleeve 40 and the U-shaped members of the frame 1 are fixed at their left ends to a sleeve surrounding and fixed to the sleeve 40 to support the latter and defining with the sleeve 40 the annular chamber 48 in which suitable heating elements may be located to prevent hardening of the plastic material. In the same way the disc 16 of FIG. 4 is fixed to a sleeve 46 which defines with a rear portion of the tube 5 an annular chamber 47 in which heating elements may also be located to prevent hardening of the plastic material. The right ends of the U-shaped members of the frame 1 of FIG. 4 are fixed to a ring 100 which is threaded onto the outlet end of the extruder shown at 101. A ring 102 is threaded into the ring 100 for clamping to the latter the right flanged end of the tube 5.

In the embodiment of FIG. 4, instead of a solid one-piece bar 14, there is provided a tubular extension 37 of the tube 5 which receives in its interior a cylindrical plug 43 threaded at its left end to the interior of the tubular portion 37 and having a conical right end extending into the wall portion of the tube 5 which is located just to the right of the portion 37 thereof. This wall portion of the tube 5 which is located just to the left of the bores 36 is of a frustoconical configuration and formed with a plurality of forwardly inclined apertures 42 through which the plastic material flows out of the tube 5 into the annular passage formed between the tubular portion 37 and the sleeve 40. At its rear end face this sleeve 40 is formed with an annular groove 39 which is filled by and in slidable engagement with an annular projection 38 located at the front face of the disc 35 so that the latter is in fluid-tight sliding engagement with the sleeve 40 as well as the tube 5. The conical rear end of the plug 43 guarantees continuous flow of the plastic material through the apertures 42.

At its exterior surface the frusto-conical perforated portion of the tube 5 is formed with axial grooves 44 and is provided between these grooves with ribs 45 which project radially beyond the exterior surface of the tubular portion 37 of the bar 37, 43 so that these ribs guarantee that the convolutions of the reinforcing filaments will be reliably located between the inner and outer surfaces of the plastic tube. The grooves 44 guarantee that the plastic material will completely surround the reinforcing filaments. The apertures 42 advance the plastic material passing therethrough between the spaces between the filament convolutions and at the same time they maintain the rigidity of the tube 5 at its front end portion joined to the bar 37, 40.

A further embodiment of the invention is illustrated in FIGS. 7-9. In this embodiment also the winding of the reinforcing filaments takes place simultaneously with the introduction thereof into plastic material. In this embodiment, however, instead of a plurality of supply spools 20, there is a single rotary supply spool 70 coaxially surrounding and turnable with respect to the extruding tube 55 which corresponds to the tube 5. The plurality of filaments are wound onto the common spool 70 in a manner permitting the three filaments, in the illustrated examples, to be simultaneously withdrawn from the supply spool 70. In this way much better use is made of the available space, there is the possibility of providing much longer reinforcing filaments than with the separate spools 20 so that the operation can be continued for a longer period, and the possibility of unbalance in the rotary winding means is greatly reduced.

In this embodiment the arms 51 form part of the frame corresponding to the frame 1, and these arms 51 are interconnected by the studs 52 in the manner shown at the top of FIG. 7.

The left arms 51 are fixed at their inner ends to a sleeve which carries an annular member 57 defining with a ring 58 and a sleeve surrounding the sleeve 59 an annular chamber 74 in which suitable heating elements may be located.

A ring 53 is fixed at its outer periphery to the right bars 51 of the frame of FIG. 7, and this ring 53 pivotally supports in notches 54 bolts which fix the ring 53 to the outlet of the extruder in the manner shown at the right in FIG. 7. The flange 56 at the right end of the extruding tube 55 is clamped in the ring 53 by an exteriorly threaded ring 53′ which is threaded into the ring 53 in the manner shown in FIG. 7. Thus, the plastic material will flow from the extruder outlet into the tube 55 in which it will have the form of a soft palstic bar. A sleeve 67 surrounds and is turnable on the tube 55 and defines with an exterior stepped portion thereof a hollow chamber 75 in which heating elements may be located. This sleeve 67 carries the spool 70 and is provided adjacent its left end with an outer annular groove adapted to receive a snap ring to prevent axail displacement of the spool 70 with respect to the sleeve 67. This sleeve 67 is fixed at its right end to a disc 65 which is in turn fixed at its right face to an annular sprocket wheel 66 driven in the same way as the sprocket wheel 16. The disc 65 fixedly carries filament guiding members 69 which extend to the left axially from the disc 65, as viewed in FIG. 7, and which are angularly spaced from each other by 120° (FIG. 8), each of the members 69 being formed with a pair of transverse bores through which the filament moves from the spool 70 to a combined closure and feeding means 71 in the manner shown in FIG. 7.

The extruding tube 55 is fixedly connected at its left end, as viewed in FIG. 7, with a tubular extension shown in section in FIG. 9 and having the frustoconical portion formed with the forwardly inclined apertures 63 shown in FIG. 9. The forward portion of this tubular extension threadly carries the plug 60 so as to form therewith a bar around which the plastic material flows from the apertures 63.

The combined closure and feeding means 71 is turnable on the forward tubular extension of the tube 55 and is fixed to the sleeve 67 for turning movement therewith as by circumferentially spaced axially extending arms of the sleeve 67 which are fixed at their left ends, as shown at the upper right of FIG. 9, to a ring which tightly presses the sleeve 71 against the sleeve 67 in the annular recess thereof shown at the left lower portion of sleeve 67 in FIG. 7. The sleeve 71 is formed with three bores 72 similar to the bores 36 and extending tangentially with respect to the tube carrying the sleeve 71, these bores 72 communicating with the right end of the annular passage surrounding the bores 63, as shown in FIG. 9. Thus, the filaments will be fed directly into the plastic material and will simultaneously be helically wound, the axially advancing plastic material moving the convolutions of the reinforcing filaments forwardly and drawing the same from the spool 70, through the filament guides 69, and then through the tangential bores 72 of the rotary combined closure and feeding means 71 into the annular passage formed between the sleeve 59 and the front tubular part of the tube 55 which carries the plug 60 and forms a bar at the front end of the assembly.

The sleeve 59 is fixed at its front end to a ring connected by screws 64 to the ring 58 which is threaded onto the sleeve shown in FIG. 9 directly surrounding and fixed to the sleeve 59 and defining part of the chamber 74. This ring 58 carries radial screws 61 which can press against the ring fixed to the front end of the sleeve 59 for radially adjusting the latter into accurate coaxial alignment with the plugged bar portion extending forwardly from the apertures 63, the screws 64 having sufficient play in their connection to the ring 58 for this purpose.

With the embodiment with FIGS. 7–9, after the reinforcing filaments 73 are threaded from the spool 70 through the guides 69 and the bores 72 and along the annular passage in which the plastic tube is thereafter formed, the extruding is started and the plastic material flows along the hollow interior 62 of the tube 55 in the form of a soft plastic bar which then flows through the apertures 63 to be immediately thereafter formed into a plastic tube wtih the wound reinforcing filaments embedded therein. The spool 70 rotates with the sleeve 67, and means other than a snap ring may be used for releasably holding the spool 70 on the sleeve 67.

Figure 10:
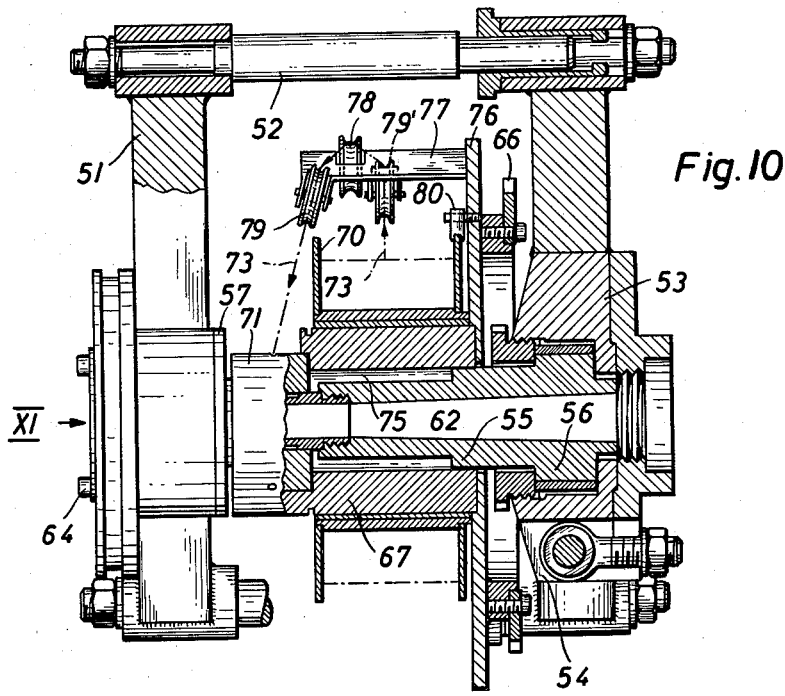
FIG. 10 is a fragmentary axial sectional elevation of an embodiment similar to that of FIG. 7 but having a different filament guiding structure.
Figure 11:
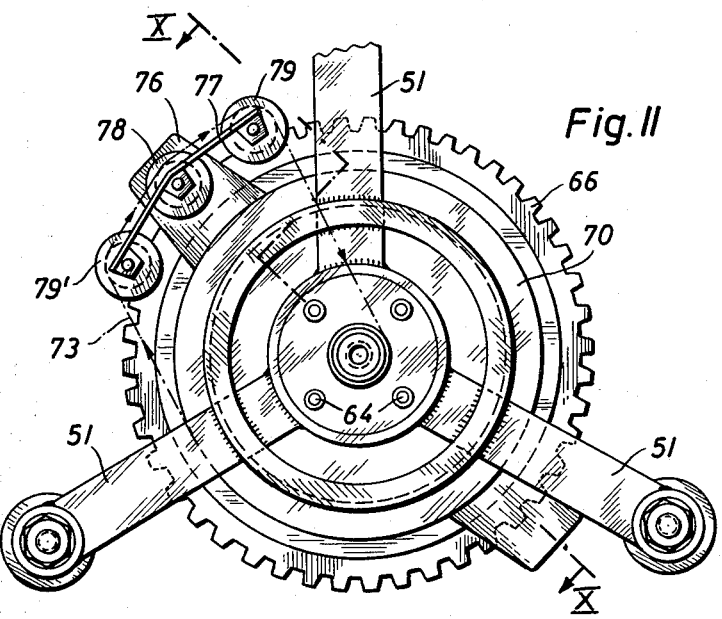
FIG. 11 is a schematic end view of the structure of FIG. 10 as seen from the left of FIG. 10.

The embodiment of FIGS. 10 and 11 differs from that of FIGS. 7–9 only with respect to the structure for guiding the reinforcing filaments 73 from the common supply spool 70 to the rotary combined closure and feeding means 71. Instead of arms 69, the embodiment of FIGS. 10 and 11 includes a plate 76 having three axially extending members 77 fixed to and extending forwardly therefrom, these members 77 being spaced from each other by 120°. Only one of these elements 77 and the structure carried thereby is shown in FIGS. 10 and 11. It will be noted that the plate 76 has at its outer periphery radial projections which carry the member 77, and the latter is substantially V-shaped and provided with a pair of lateral wings extending freely beyond the radial projection to which the member 77 is fixed so that these wings are springy and can yield. Each of these wings is provided with a pair of ears carrying a pin which turnably supports a guide roll 79 for free turning movement in part in a cutout of wing. The member 77 is formed in alignment wtih the radial projection of plate 76 with an intermediate cutout accommodating an intermediate guide roll 78 supported for free turning movement on a pin carried by a pair of ears integral with the member 77. In this way the filaments are guided without any sharp bends in the manner shown in FIGS. 10 and 11 from the spool 70 to the sleeve 71. As may be seen from FIG. 11 the filament 73 first passes over the left roll 79, then along the intermediate roll 78, and finally around the right roll 79 to the tangential bore of the sleeve 71. With this arrangement the filaments will not break even if they are sharply pulled at regular intervals.

In the embodiment of FIGS. 10 and 11 the plate 76 turnably carries a pawl 80 cooperating with teeth at the periphery of the right flange of the spool 70, as viewed in FIG. 10, so that with this structure the spool 70 is constrained to rotate with the plate 76 driven by the sprocket wheel 66. The teeth which cooperate with pawl 80 are inclined in a direction permitting the spool 70 to turn due to the drawing of the filaments therefrom with respect to the sleeve 67 and plate 76. The cooperation of the pawl 80 with the spool 70 serves to overcome the inertia of the spool 70 when the operations are started so as to prevent excessive tensioning and possible breaking of the filaments at this time. This arrangement may also be used with the embodiment of FIGS. 7–9.

The provision of a single spool 70 coaxially arranged with respect to the extruding tube greatly reduces the cost of the structure and permits longer lengths of reinforced plastic tube to be continuously manufactured at greater rates of speed, as compared to conventional apparatus for manufacturing reinforced plastic tubing.

It will be noted that in all embodiments of the invention, the structure of the invention forms a single unitary assembly capable of being connected as a single unit to the outlet end of a conventional extruder and capable of being removed as a single unit therefrom.

It will be understood that each of the elements described above, or two or more together, may also find a useful application in other types of processes and apparatus for manufacturing plastic tubes differing from the type described above.

While the invention has been illustrated and described as embodied in processes and apparatus for manufacturing reinforced plastic tubes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a process for manufacturing a reinforced plastic tube, the steps of coiling a reinforcing filament into a helix of preselected diameter; introducing a plastic material in soft condition from the interior of the helix through and about the convolutions thereof to thus embed the filament convolutions in plastic material; and subsequently extruding the plastic material with the coiled filaments embedded therein in the form of an elongated tube.

2. In a process for manufacturing a reinforced plastic tube, the steps of coiling a reinforcing filament into a helix of preselected diameter; continuously extruding a stream of substantially liquid plastic material in axial direction of said helix into the interior thereof while forcing said plastic material to flow through and about the convolutions thereof to thus embed the filament convolutions in plastic material; and subsequently extruding the plastic material with the coiled filaments embedded therein in the form of an elongated tube.

3. In a process for manufacturing a reinforced plastic tube, the steps of coiling a reinforcing filament into a helix of preselected diameter; continuously extruding a stream of substantially liquid plastic material in axial direction of said helix into the interior thereof while forcing said plastic material to flow through and about the convovlutions thereof to thus embed the filament convolutions in plastic material; and subsequently extruding the plastic material with the coiled filaments embedded therein in the form of an elongated tube of an inner diameter smaller and an outer diameter greater than said preselected diameter.

4. In an apparatus for manufacturing reinforced plastic tubes, in combination, extrusion means for extruding a stream of substantially liquid plastic material in one direction, said extrusion means including a first extrusion tube means having an elongated cylindrical portion of a preselected inner diameter and an exit end portion having an inner cylindrical surface of a diameter greater than said preselected diameter; tube forming means extending forwardly in said one direction from said exit end portion for receiving the stream of plastic material from said extrusion means and for forming said plastic material into tubular configuration, said tube forming means including second extrusion tube means coaxial with said first extrusion tube means and a core located within and coaxial with said second extrusion tube means to define therewith an annular gap; feeding means at the junction of said elongated portion and said exit end portion of said first said extrusion tube means for feeding reinforcing material into said exit end portion along a diameter greater than said preselected diameter and smaller than the diameter of said inner surface of said exit end portion; and means in said exit end portion at the junction thereof with said tube forming means for directing the flow of plastic material extruded by said extrusion means toward said cylindrical surface of said exit end portion and into said gap of said tube forming means, whereby plastic material will flow through and about said reinforcing material introduced into said exit end portion and so that a reinforced plastic tube with the reinforcing material completely embedded in the plastic material of the tube will issue from said tube forming means.

5. In a process as recited in claim 2, coiling the filament into the form of a helix simultaneously with the introduction of the filament into the material of the bar.

6. In an apparatus for manufacturing reinforced plastic tubes, in combination, an extruder outlet through which plastic material flows from an extruder; an elongated hollow tube fixed fluid-tightly to and extending from said outlet to receive plastic material therefrom so that plastic material flows from the extruder outlet along the interior of said tube, the latter having an end distant from said outlet; an elongated solid bar fixed to said end of said tube and forming a continuation thereof, said tube being formed in a wall portion thereof adjacent to said bar with cutouts through which the plastic material flows from the interior of said tube; a sleeve surrounding and spaced from said bar to define with the latter an elongated annular passage, said sleeve extending rearwardly from said bar along at least said wall portion of said tube and surrounding said wall portion while being spaced therefrom to form with said wall portion a continuation of said annular passage; and combined closure and feeding means cooperating with said tube and sleeve for at least partially closing said annular passage adjacent the rear end of said wall portion of said tube and for feeding a reinforcing material into said passage, whereby the plastic material in said tube will flow through the cutouts of said wall portion thereof into said annular passage and forwardly along the same while having the reinforcing material embedded therein, said annular passage being open at its front end so that a reinforced plastic tube issues from said front end.

7. In an apparatus as recited in claim 6, supply means cooperating with said combined closure and feeding means for supplying reinforcing material thereto, said supply means, tube, bar, sleeve, and combined closure and feeding means forming part of a unitary assembly capable of being connected as a unit with said extruder outlet.

8. In an apparatus as recited in claim 6, said wall portion of said tube being formed by said cutouts into the configuration of a plurality of axially extending circumferentially spaced plates respectively located in radial planes, respectively extending at their rear ends forwardly from the remainder of said tube and respectively fixed at their front ends to said bar so that said plates define between themselves axially extending radial passages through which the plastic material flows from the interior of said tube into said annular passage and axially along the same to said open front end of said annular passage.

9. In an apparatus as recited in claim 6, winding means cooperating with said tube for winding at least one reinforcing filament onto an exterior surface portion of said tube located rearwardly of said combined closure and feeding means; a second sleeve surrounding said tube rearwardly of said combined closure and feeding means and spaced from said tube by a distance approximately equal to the thickness of the filament to prevent the convolutions thereof from overlapping, said filament extending through said combined closure and feeding means into said annular passage and forming the reinforcing material, said combined closure and feeding means including a plurality of levers distributed about said tube and respectively supported for turning movement about axes parallel to said tube, said levers respectively having arcuate substantially knife-edge ends engaging the exterior surface of the tube and separating the convolutions of the filament just before the latter enters into said annular passage, and a plurality of springs respectively connected to said levers and maintaining said ends thereof against said tube.

10. In an apparatus as recited in claim 9, said winding means and said combined closure and feeding means being turnable on said tube and being connected together for turning movement as a unit so that said combined closure and feeding means cannot be angularly displaced with respect to said winding means; and turning means operatively connected with said winding means for turning the latter and said combined closure and feeding means around said tube.

11. In an apparatus as recited in claim 6, said combined closure and feeding means including a disc turnable on said tube and fluid-tightly engaging the latter and said sleeve, said disc being formed with a bore passing therethrough from said annular passage to an exterior rear face of said disc directed away from said passage and said bore extending tangentially with respect to said tube so that a reinforcement in the form of a flexible filament may pass through said bore into said annular passage while said disc turns to provide in the plastic material in said annular passage a helically wound reinforcing filament.

12. In an apparatus as recited in claim 11, and turning means operatively connected to said disc for rotating the latter at an angular speed slow enough to cause the plastic material advancing forwardly along said annular passage to space the convolutions of the filament in the plastic material from each other so that the plastic material can flow between and around the convolutions of the filament.

13. In an apparatus as recited in claim 11, said wall portion of said tube having an exterior surface of frustoconical configuration which becomes gradually smaller in diameter forwardly from said combined closure and feeding means toward said bar to facilitate the movement of the reinforcing filament into the plastic material.

14. In an apparatus as recited in claim 11, said wall portion of said tube being formed at its exterior surface with a plurality of axial grooves distributed circumferentially around the axis of said tube and said wall portion having between said grooves ribs which extend radially beyond the exterior surface of said bar so that the plastic material can flow between the reinforcing filament and the axis of the tube and so that the filament will be spaced in the tube of plastic material formed in said annular passage both from the inner and the outer surface of the plastic material.

15. In an apparatus as recited in claim 11, a single filament supply spool located rearwardly of said disc coaxially on said tube and supported by the latter for rotation, and guide means between said spool and disc for guiding a filament from said spool into said bore of said disc.

16. In an apparatus as recited in claim 15, said guide means, supply spool, and disc being connected to each other for turning movement together around said tube.

17. In an apparatus as recited in claim 16, said guide means including a plurality of guide rolls axially and circumferentially displaced with respect to each other and guiding the filament without any sharp bends therein from said spool to said disc.

18. In a process for manufacturing a reinforced plastic tube, the steps of coiling a reinforcing filament into a helix of preselected diameter and preselected pitch; continuously extruding a stream of substantially liquid plastic material in axial direction of said helix into the interior thereof while forcing said liquid plastic material to flow through and about the convolutions thereof to thus embed the filament convolutions in plastic material; and subsequently extruding the plastic material with the coiled filaments embedded therein in the form of an elongated tube of an inner diameter smaller and an outer diameter greater than said preselected diameter.

References Cited in the file of this patent

UNITED STATES PATENTS

| | | |
|---|---|---|
| 1,111,418 | Wadsworth | Sept. 22, 1914 |
| 2,767,431 | Laubarede | Oct. 23, 1956 |
| 2,800,683 | Teichmann | July 30, 1957 |